Dec. 1, 1959 J. J. EBERS ET AL 2,915,647

SEMICONDUCTIVE SWITCH AND NEGATIVE RESISTANCE

Filed July 13, 1955

INVENTORS J. J. EBERS
S. L. MILLER

BY D. H. Wilson, Jr.
ATTORNEY

United States Patent Office 2,915,647

Patented Dec. 1, 1959

2,915,647

SEMICONDUCTIVE SWITCH AND NEGATIVE RESISTANCE

Jewell J. Ebers, Whippany, and Solomon L. Miller, Murray Hill, N.J., assignors to Bell Telephone Laboratories, Incorporated, New York, N.Y., a corporation of New York Application July 13, 1955, Serial No. 521,765

8 Claims. (Cl. 307—88.5)

This invention is related to circuit elements having bodies of semiconductive material and more particularly to bodies including rectifying barrier regions.

A principal object of this invention is to facilitate the control of current in the vicinity of a rectifying barrier region within a semiconductive body.

Other objects are to attain large values of negative dynamic resistance; to optimize the characteristics of a circuit element of the type disclosed in K. B. McAfee application Serial No. 340,529, filed March 5, 1953, now Patent 2,790,034, issued April 23, 1957, and K. G. McKay application Serial No. 464,737, filed October 26, 1954, both utilizing avalanche breakdown to obtain current multiplication in a semiconductor; to alter, during operation, the effective area of a semiconductive junction; and to switch a circuit element having a semiconductive body selectively between a high and a low resistance state.

A feature of this invention resides in altering the effective area of a rectifying junction in a semiconductive body in response to changes in the current within that body.

Another feature of this invention includes altering the current multiplication, $\alpha$, of a semiconductive device in response to a current through the device. A device of this nature may include a semiconductive body having emitter, collector and base regions wherein current is injected from the emitter into the base and flows to the collector. In this configuration, $\alpha$ is related to the product of the fraction $\gamma$ of the emitter current carried by minority charge carriers injected from the emitter into the base and the fraction $\beta$ of the minority charge carriers leaving the emitter which arrive at the collector. The variations in $\alpha$ are realized by utilizing semiconductor device geometries which enagle large variations in either $\gamma$ or $\beta$ or both with current.

An additional feature involves device geometries which introduce a high lateral resistance in the base region of a semiconductor to produce potential drops along that resistance which introduce variations in the bias applied across a rectifying barrier in proximity to that lateral resistance.

In particular, this invention involves the utilization of the potential drop within a body of semiconductive material due to current flowing therein to alter the potentials across a rectifying barrier on the body, whereby one portion of the barrier has a greater potential imposed across it than other portions spaced therefrom. One utilization of this mechanism, in accordance with this invention, involves imposing on a minority carrier emtting junction a graded forward potential which decreases from the inner portions of the junction toward its peripheral portions by spacing the minority carrier collector closer to that inner portion than to the peripheral portions. The current path within the intermediate semiconductive material is longer from the peripheral regions to the collector than from the inner portions, and the potential drop in that longer path is greater than in the path from those inner portions. At high currents an emitter of this nature becomes so biased that essentially all of the minority carriers are emitted from the center portion of the junction and the outer portions are effectively eliminated. The effective reduction in emitter area and the confinement of the principal emitting area to a region in relatively close proximity to a minority carrier collector, increases the proportion $\beta$ of the injected minority carriers which are collected, thereby increasing the current multiplication of the device as a function of the current through the device.

In accordance with another embodiment, the fraction of the emitter current carried by minority charge carriers in the base region is made a function of the emitted current by grading the resistivity of the material adjacent the emitter junction. When the resistivity of the base material adjacent the lateral periphery of the emitter is lower than that adjacent the inner portions, the over-all emission efficiency at low currents is degraded to a rather low value while at higher currents the peripheral portions of the emitter are less forward biased in accordance with the mechanism discussed above and a greater portion flows from those inner portions. This increases the effective emission efficiency and in turn the current multiplication.

Although variations in current multiplication as a function of current in a semiconductor are useful for a number of applications, for example in transistors which can be utilized in the manner of variable-mu vacuum tubes, it will be described below as employed in a device exhibiting avalanche multiplication wherein the increased multiplication with increased current produces a characteristic which, over a relatively wide range, offers an increase in current with a decrease in voltage and thus a negative dynamic resistance.

The invention and the above and other objects and features thereof will be more readily appreciated from the following detailed description when read in conjunction with the accompanying drawings, in which.

Figure 4:
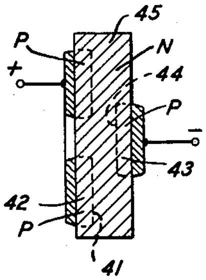
Figure 5:
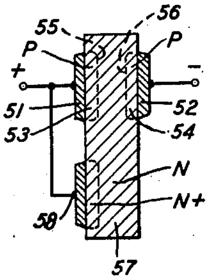
Figure 6:
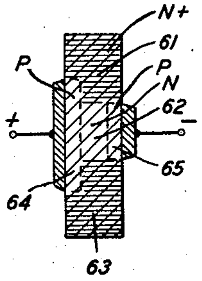

Figs. 4, 5, and 6 are other embodiments of this invention illustrating other geometries which offer a current multiplication which is a function of current.

As set forth in the aforenoted applications of K. B. McAfee and K. G. McKay, it has been recognized that a substantial multiplication of current occurs in the depletion region of a reverse biased p-n junction when the field in the vicinity of that junction and the distance across which it is imposed attain a critical relationship. This mechanism has been referred to as avalanche breakdown and has been shown to offer a current multiplication within the semiconductive body which can be paralleled to a modified form of the Townsend $\beta$ discharge theory for gases.

Figure 1:
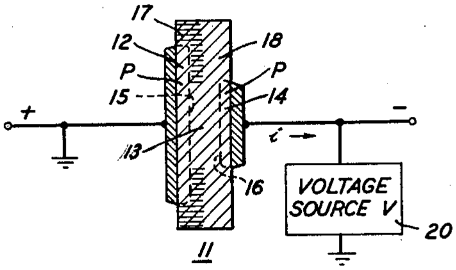
Fig. 1 is a sectioned schematic elevation of a unit representing one form of an avalanche multiplication diode in accordance with this invention.

A diode structure utilizing these mechanisms is disclosed in Fig. 1, comprising a semiconductive body 11 including three contiguous zones 12, 13 and 14 of alternately opposite conductivity type. This structure as well as those shown in Figs. 2, 4, 5 and 6, as illustrated in Fig. 3 offers a negative dynamic resistance over a relatively large operating range. The characteristics of this structure will be more fully appreciated from the following analysis based upon previously published material wherein it has been shown that the current multiplication due to avalanche multiplication can be represented by M, in accordance with the general empirical equation $$M=\frac{1}{1-\left(\frac{V}{V_B}\right)^n}$$

where $V_B$ is the body breakdown voltage of a rectifying junction, V is the voltage applied across the junction, and $n$ is a constant for a given type of junction. For example, for alloy junctions having a steep impurity gradient, commonly termed a step junction, $n$ is of the order of 4.5 to 6.5 for p-type germanium and is of the order of 3 for n-type germanium. The breakdown voltage for an alloy step junction, where the material on one side of the junction is of appreciably greater resistivity than that on the other side, can be calculated from the question $$V_B=\frac{K}{|N_D-N_A|^{.725}}$$

where K is a constant and $N_D-N_A$ is the net impurity concentration on the high resistivity side of the junction. The total current multiplication $M_T$ of a structure including an emitter of minority charge carriers arranged to emit those carriers into the high resistivity material adjacent the reverse biased junction is of the form $$M_T=\alpha M=\frac{\alpha}{1-\left(\frac{V}{V_B}\right)^n}$$

where $\alpha$ is the current multiplication factor of the structure apart from the avalanche multiplication and is directly dependent upon the product of $\gamma$ and $\beta$ where $\gamma$ is the ratio of the minority carriers injected from the emitter into the high resistivity semiconductive material to the total current flow through the emitter, and $\beta$ is the ratio of minority charge carriers collected at the collector to the minority charge carriers emitted by the emitter.

A device of the type shown in Fig. 1 has a current characteristic satisfying the equation $$I=\alpha MI_E+MI_{CO}=I_E$$

This gives a voltage current relationship $$V=V_B\sqrt[n]{1-\left(\alpha+\frac{I_{CO}}{I}\right)}$$

where I is the total current through the device which, for a two terminal device, is equal to the emitter current $I_E$; and $I_{CO}$ is the saturation current of the reverse biased collector junction.

In accordance with this invention voltage V can be made to decrease as the total current I is increased over a range of operation by altering the current multiplication factor $\alpha$ as a function of current. A geometry utilizing several mechanisms to optimize these variations is shown in Fig. 1. It comprises a semiconductive body 11 of n conductivity type, single crystal germanium having a p conductivity type zone 12 on one face of substantial lateral extent and a second p conductivity type zone 14 on an opposite face of smaller lateral extent. Zones 12 and 14 are separated from base region 13 by n-p junctions 15 and 16. When junctions 15 and 16 are circular in their lateral dimensions and their projections through the base zone 13 are concentric, the current paths through the base zone from one to the other are of low resistance in their central regions as compared to the much longer paths between their peripheries 17 and 18. When zone 12, the larger of the two, is employed as an emitter, charge carriers emitted at the center of junction 15 have a high probability of reaching junction 16; however, charge carriers emitted from the peripheral portions 17, particularly those portions beyond the projection of junction 16, due to the random nature of their flow have less likelihood of reaching junction 16 before being lost as by recombination. Thus, it may be said that the inner portions of the emitter in combination with junction 16 offer a system having a high $\beta$ while the outer portions 17 of the emitter in combination with junction 16 comprise systems having $\beta$'s which decrease with increased separation from the center. At low emitter currents the potentials across the various portions of emitter junction 15 are essentially constant, holes are injected in essentially uniform density over the entire junction and the low $\beta$ of the peripheral portions 17 produces a low $\alpha$ and hence a high voltage according to the derived current-voltage relationship. As the total current increases, that portion of the majority carrier current flowing in the long paths between the peripheral portions of junction 15 and junction 16 induces a greater potential drop in the portions of the base region adjacent those peripheral portions 17 than does the current flowing in the shorter inner paths. Thus, the peripheral portions 17 of junction 15 are biased at a lower forward potential than the inner portions and emit a smaller portion of the total emitter current. This tends to remove those peripheral regions which have low $\beta$'s from the emitter and thereby increase the over-all $\alpha$ of the system.

Accordingly, a voltage source 20 is applied to the two terminals of the device so that the potential between the two terminals is of a polarity to bias portion 17 in the forward direction relative to the base zone 13 and of a magnitude, for a decreasing voltage characteristic with increasing currents and $\alpha$'s greater than unity, to cause substantial current multiplication at junction 16.

The base zone 13 may also be constructed to offer a means of increasing the $\alpha$ of the system again by a further tendency to degrade the emission characteristics of the peripheral portions of the emitter. This effect is achieved by grading the resistivity of the base material adjacent the emitter junction 15 in a lateral direction so that the material adjacent the inner portion of the junction is of high resistivity, for example 1 ohm-centimeter, and that adjacent the lateral periphery of the junction is of relatively low resistivity, for example 0.1 ohm-centimeter. Since the low resistivity material contains a concentration of electrons available for conduction which is more comparable to the concentration of holes similarly available in the p-type emitter section, a forward bias applied across the junction between those materials results in the injection of the majority carriers of each section into the other in comparable densities and thus produces a low $\gamma$. On the other hand, the high resistivity portion of the base injects a very small electron current into the adjacent portion of the emitter, hence the $\gamma$ of that portion is high. At low currents and at a substantially uniform junction potential, the low value of $\gamma$ in the peripheral regions degrades the $\alpha$ of the peripheral portions and thus the over-all $\alpha$ of the unit. At high currents the relatively low forward bias across the peripheral portions of the emitter junction causes only a small portion of the total current flowing across that junction to flow in those portions. Accordingly, the low $\gamma$ of those portions is less significant in the over-all $\gamma$ of the emitter. This results in a large difference between the low current and high current $\alpha$'s.

Figure 2:
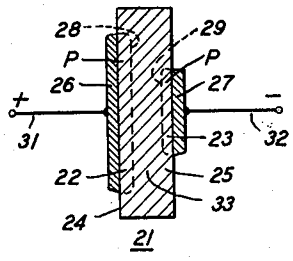
Fig. 2 is an elevation of an avalanche multiplication diode utilizing in the main one of the mechanisms functioning in the device of Fig. 1.
Figure 3:
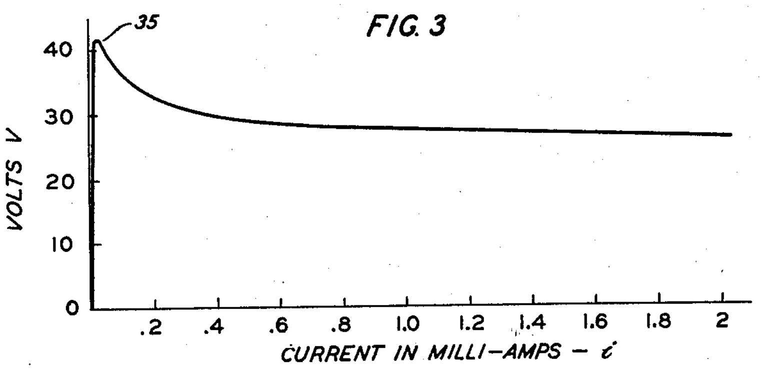
Fig. 3 is the voltage current characteristic of the device of Fig. 2.

The device of Fig. 2 employs the potential drop in the base region without a base resistivity gradation to attain the characteristics of Fig. 3. The semiconductive wafer 21 is of n-type single crystal germanium, for example of about 0.7 ohm-centimeter resistivity about 1+½ mils thick, and having square major faces about 50 mils on a side. P conductivity type zones 22 and 23 are formed on opposite portions of major faces 24 and 25 of the wafer 21. One typical means of forming these zones is by alloying bodies of indium 26 and 27 into the wafer under suitable conditions of time and temperature, whereby the junctions 28 and 29 at the interface between those zones and the body are separated by about one mil. These indium masses may be formed by punching discs of 15 and 30 mils diameter from indium sheet material eight mils thick which has been cleaned as by etching lightly in dilute hydrochloric acid and then formed into spheres by heating to 300° C. in dry hydrogen. The larger sphere is then mounted in a suitable graphite jig containing a hole 30 mils in diameter and held against the germanium wafer under pressure. The jig is then brought up to 450° C. in dry oxygen-free hydrogen in about three minutes and held there for about five minutes to alloy the indium to the germanium. After cooling, the jig may be removed and a similar graphite jig containing a 15 mils diameter hole applied to the opposite face of the wafer so that its center is on a line normal to the wafer face running through the center of the 30 mils alloyed region. The smaller indium sphere is mounted in this second jig and held against the wafer surface with pressure while the heating cycle is repeated at an oven temperature of 500° C., maintained over an interval of about 10 minutes.

When this alloying process is practiced on a wafer having its faces cut on the 1—1—1 crystal plane, n-p junctions are formed within the wafer parallel to the major faces and spaced about one mil apart. These junctions, at their interface with the wafer surface, tend to be shorted by indium material which has extended beyond the peripheries of the material converted to p conductivity type beneath the alloyed mass. In order to remove this junction shorting material the wafer may be etched for a few seconds, for example, in an etchant consisting of three parts nitric acid and one part hydrofluoric acid, followed by a water rinse, a twenty second etch in hydrochloric acid, a second water rinse, a thirty second etch in concentrated nitric acid, a water rinse, and a rinse in alcohol. Leads 31 and 32, for example of 5 mil diameter nickel wire, may then be soldered to indium masses 26 and 27 with indium solder.

The above fabricating techniques are not intended to restrict the present invention but rather to be illustrative of one method of building successful devices in accordance therewith. These techniques are typical of those which can be employed to fabricate emitter and collector zones, and electrical connections to those zones for devices of the type shown in Figs. 1, 4, 5, and 6.

When operated with the 30 mil diameter p-type region 22 biased as the emitter, lead 31 biased positive with respect to lead 32, a configuration as shown in Fig. 2, manufactured as described above, had a characteristic as shown in Fig. 3 such that upon exceeding the critical voltage $V_C$, occurring at about 41 volts, it entered a negative resistance region and exhibited negative resistance of approximately 1500 ohms in the range of 0.5 to two milliamperes. In the characteristics of Fig. 3 the breakdown potential of the device is defined as the critical potential $V_e$ of the point 35 at which the total current multiplication $M_T$ first becomes equal to unity.

The mode of operation for this structure is similar to that of Fig. 1. At low values of current the $\alpha$ of the transistor is low and substantially the full breakdown voltage can be applied without triggering it into the high current condition. The low $\alpha$ is attributed to a low transport efficiency $\beta$ resulting from the loss of emitted minority carriers in the diffusion region between junctions 28 and 29, particularly at the peripheral regions at junction 28. As the current increases a voltage drop in the base layer or bulk of body 21 from the peripheral regions 33 of emitter 22 reduces the forward potential on those portions of the emitter junction. This biases the outside of the emitter less forward than its center. Accordingly, the density of charge carriers injected at the center is proportionally greater than the density injected at the periphery and since $\beta$, the transport efficiency of that center portion, is high as compared to the peripheral portions, the total $\alpha$ is increased. Visualized in another manner, as the current increases in the base material near the emitter junction the peripheral portions of the junction are reduced in their forward bias and effectively eliminated as emitting regions, thereby removing those portions of the emitter which are inefficient and degrade the multiplication factor $\alpha$.

Inasmuch as this mechanism of varying $\alpha$ depends upon a potential drop in the bulk of the semiconductor body 11, an optimum design offering the greatest extremes of path resistance in that material would suggest the use of a thin wafer of material of as high resistivity as possible consistent with reasonable breakdown voltage and power dissipation requirements. Further, inasmuch as the avalanche multiplication of the reverse biased junction for step junctions is greater for n-type base regions than for p-type regions in germanium, the optimum design should be a p-n-p structure.

Fig. 4 illustrates another geometry having an $\alpha$ which is a function of current by virtue of the same mechanism discussed above. In Fig. 4 the step junction 41 of the emitter region 42 is annular in form and has its inner and outer peripheries concentric with a projection of the central collector region 43 and its junction 44. The diameter of the collector junction is less than the outer diameter of the emitter junction. Thus, at high current densities the outer peripheral regions of the emitter have a very reduced forward bias as compared with the inner peripheral regions, due to the long current path in the base region 45.

Fig. 5 shows a semiconductive structure having two external terminals and three connections to the semiconductive body. Two of these connections, 51 and 52, may be of the alloy type which form type regrowth layers 53 and 54 having step junctions 55 and 56 to the n-type base region 57 respectively formed by a process similar to that outlined above. The third connection 58 to the body may be ohmic in form and functions much in the manner as a base connection for a transistor. The separation of this ohmic base connection 58 from the emitter junction is dictated by the characteristics desired of the device, inasmuch as this connection is connected directly to the emitter connection 51. This form of structure corresponds in operation to that disclosed in J. J. Ebers and S. L. Miller application Serial No. 515,866 filed June 16, 1955, now Patent 2,831,984, issued April 22, 1959, wherein a current through an external resistance connected between the base and emitter connections of a triode transistor varied the forward bias on the emitter to provide a negative resistance. In the device of Fig. 5, the base region material between connection 58 and the emitter junction 55 provides a potential drop which is a function of the current flowing through the device and controls the forward bias on the emitter and thus the over-all current multiplication factor of the unit.

Another two terminal negative resistance device is shown in Fig. 6. This structure achieves a current dependent $\alpha$ in the same manner as the unit of Fig. 1. The structure differs from Fig. 1 in the geometry of base region 61; the present geometry requires less rigid processing controls during fabrication. This base region includes a first portion 62 of high resistivity material extending from the emitter region 64 to the collector region 65 and a second portion 63 of low resistivity extending through the thickness of the base region and laterally at least over a substantial portion of the emitter which extends beyond a projection of the collector. This low resistivity material reduces the $\gamma$ of the peripheral portions of the emitter by a substantial amount at low currents and is less effective in reducing it at high currents as described with regard to Fig. 1.

In Fig. 1 the low-resistivity region as represented by the horizontal lines extends only a short distance into the base region while the corresponding region 63 in Fig. 6 penetrates the base. Both of these regions can be produced by diffusing a donor such as phosphorus, arsenic or antimony into high resistivity n-type material, for example from a vapor deposited surface film. In each instance the high resistivity material against which an inner portion of the emitter is to be positioned is preserved by masking an appropriately shaped region during the vapor deposition. Since the donors are diffused through the base region of Fig. 6, no critical times and temperatures are involved as in the case where a precise diffusion depth is sought. On the other hand, the lateral extent of the low resistivity material in Fig. 6 should be so restricted that it does not intersect the collector region 65 while the extent of that material in the device of Fig. 1 is not so limited. Accordingly it can be appreciated that the structures of Figs. 1 and 6 each have advantages and may therefore be utilized in accordance with a balance between the operating demands of the device and the economies of its manufacture.

By way of explanation in connection with the foregoing description, it will be understood that the expression "conductivity-type region or zone" refers to a portion of the semiconductor body containing an excess of conductivity-type determining impurities, as exemplified by the emitter region 22 of the device of Fig. 2. Further, the expression "electrode connection" refers to the metallic electrode making low resistance contact with the semiconductor body, as exemplified by the portion 26 of Fig. 2. In addition, the term "lead" refers to the metallic wire affixed to the metallic electrode for applying a voltage thereto, as shown, for example, by the wire lead 31 of Fig. 2.

The above-described embodiments are understood to be illustrative and are not to be read in a limiting sense. For example, while the specific devices described have been formed of germanium having alloyed step junctions and are of a p-n-p configuration, it is to be understood that other semiconductors, such as silicon, silicon-germanium alloys, and intermetallic compounds of group III and group V elements might be employed as the semiconductor in a device of this type. Further, while the specific parameters such as breakdown voltage and the avalanche multiplication factor would vary with the basic material and the form of the junctions therein, they in general follow the characteristics set forth above and can readily be adopted for use as proposed. An appropriate reversal of potentials enables an n-p-n structure to be substituted for the p-n-p structures of the illustrative embodiments.

Inasmuch as the above embodiments are merely illustrative, it is to be understood that variations of the proposed structures and applications may be devised by those skilled in the art without departing from the spirit and scope of this invention.

What is claimed is:

1. A circuit controlling device comprising a wafer-shaped body of semiconductive material having a first and a second major face, a first region of said body of one conductivity type, a second region of said body adjacent said first face, and a third region of said body adjacent said second face, said second and third regions being of a conductivity type opposite that of said first region and each defining a rectifying junction therewith substantially parallel with said respective major faces, a high conductivity surface on said second and third regions and spaced from said first region, said high conductivity surface on said second region having substantially the same lateral extent as said second region, said second region having a substantially greater lateral extent than said third region, and means for impressing between said second and third regions a potential of polarity to bias said junction of said second region in the forward direction and of magnitude sufficient to cause substantial current multiplication at said junction of said third region, said first region being free of any electrode connection.

2. A device in accordance with claim 1 wherein a portion of said first region adjacent the junction of said second region has a lateral resistivity gradient which decreases toward the lateral periphery of said junction.

3. A circuit controlling device comprising a body of semiconductive material, including an emitter region, a collector region, and a base region, a separate rectifying junction between said base region and each of said emitter and collector regions, electrode connections to said emitter and collector regions, said emitter electrode connection having substantially the same lateral extent as said emitter region, said base region including a first portion adjacent one part of said junction of said emitter region of relatively high resistivity material and a second portion adjacent another part of said junction of said emitter region of relatively low resistivity material, and means for impressing between said connections a potential of polarity to bias said junction of said emitter in a forward direction and of a magnitude sufficient to cause substantial current multiplication at said other junction, said base region being free of any electrode connections.

4. A device in accordance with claim 3 wherein said first portion in said base region is at least partially bounded by said second portion.

5. A device in accordance with claim 3 wherein said first and second portions of said base region extend across said base region and said second portion is limited in its lateral extent to an area outside of the periphery of said collector region.

6. A circuit controlling device comprising a semiconductive wafer having on opposite faces first and second zones each forming a distinct rectifying junction with a portion of the wafer intermediate the two zones, the area of the first rectifying junction associated with said first zone being substantially greater than the area of the second rectifying junction associated with said second zone, a pair of electrode connections to said first and second zones, the electrode connection to said first zone having substantially the same lateral extent as said first zone and means for impressing between said electrode connections a potential of polarity to bias said first rectifying junction in the forward direction and of a magnitude sufficient to cause substantial current magnification at said other junction, the portion of the wafer intermediate the two zones being free of any electrode connection.

7. A circuit controlling device comprising a semiconductive wafer having a pair of opposed major faces separated of the order of a few mils, first and second zones on said faces each forming a separate rectifying junction with the portion of said wafer intermediate the two zones, the first rectifying junction associated with said first zone encompassing a projection of the area of the second rectifying junction associated with said second zone and being of substantially greater area than said second junction, electrode connections to said first and second zones, the electrode connection to said first zone having substantially the same lateral extent as said first zone and means for impressing between said connections a potential of polarity to bias said first junction in the forward direction and a magnitude above the breakdown potential of the other junction, the portion of the wafer intermediate the two zones being free of any electrode connections.

8. A circuit controlling device comprising a semiconductive wafer having on opposite faces first and second zones each forming a distinct rectifying junction with a portion of the wafer intermediate the two zones, the area of the first rectifying junction associated with said first zone being substantially greater than the area of the second rectifying junction associated with said second zone, a portion of the wafer intermediate said first and second zones and adjacent said first junction having a lateral resistivity gradient which decreases toward the lateral periphery of said junction, a pair of electrode connections to said first and second zones, the electrode connection to said first zone having substantially the same lateral extent as said first zone and means for impressing between said electrode connections a potential of polarity to bias said first rectifying junction in the forward direction and of a magnitude sufficient to cause substantial current magnification at said other junction, the portion of the wafer intermediate the two zones being free of any electrode connection.

References Cited in the file of this patent

UNITED STATES PATENTS

| | | |
|---|---|---|
| 2,603,694 | Kircher | July 15, 1952 |
| 2,648,805 | Spenkel et al. | Aug. 11, 1953 |
| 2,666,814 | Shockley | Jan. 19, 1954 |
| 2,672,528 | Shockley | Mar. 16, 1954 |
| 2,708,646 | North | May 17, 1955 |